Inventor
JOHN RODNEY DYSON FULLER

By *Bailey, Stephens*
*& Huettig*
Attorneys

Sept. 13, 1966   J. R. D. FULLER   3,271,948
VARIABLE AREA NOZZLES
Filed Aug. 17, 1964                           4 Sheets-Sheet 4

Inventor  FULLER
JOHN Rodney DYSON

By
Attorneys

United States Patent Office 3,271,948
Patented Sept. 13, 1966

3,271,948
VARIABLE AREA NOZZLES
John R. D. Fuller, Bristol, England, assignor to Bristol Siddeley Engines Limited, Bristol, England, a British company
Filed Aug. 17, 1964, Ser. No. 390,094
Claims priority, application Great Britain, Aug. 23, 1963, 33,496/63
9 Claims. (Cl. 60—35.55)

The invention relates to variable area jet nozzle systems comprising a nozzle having an outlet defined by a lip, and an external visor for selective partial blanking-off of the outlet, the nozzle and visor being capable of relative rotary movement about an axis which lies transverse to the discharge from the outlet and which lies upstream of the outlet, the lip thereby having an arcuate track of movement relative to the visor, the visor being shaped to have an operative edge which by the relative movement is carried between an inoperative position clear of the track and an operative position extending fully across and close to an end portion of the track.

According to the invention the visor has a flow control surface extending downstream from its operative edge in a direction and for a sufficient distance to constitute an important factor in determining the direction of thrust of the system when the nozzle outlet is partially blanked off by the visor.

The invention may be applied to a system including main structure to which the visor is fixed, and a bearing supporting the nozzle to swivel on the main structure about the axis of relative movement.

So long as the nozzle outlet is wholly in that part of the track which is clear of the visor, the direction of the thrust varies directly with the swivelling movement of the nozzle, but as the nozzle outlet moves in that part of the track in which the outlet becomes partially blanked-off by the visor, the flow control surface prevents, or at least reduces, corresponding swivelling movement of the direction of the thrust.

A system can therefore be provided in which swivelling of the nozzle through a first angular range swivels the direction of thrust through a corresponding range, and swivelling of the nozzle through a second angular range reduces the throat area of the nozzle while the direction of thrust remains substantially constant.

Such a system is useful in aircraft provided with one or more nozzles which swivel from a position in which the efflux is discharged downwards for vertical or short run take-off and landing to a position in which the efflux is discharged rearwards for horizontal propulsion. If, for the purpose of assisting take-off and landing, additional fuel is burnt in the working fluid supplied to the nozzle, it will be necessary during this phase to operate with maximum nozzle throat area and maximum sensitivity of control of the direction in which the working fluid is discharged, but when transition to horizontal flight has been effected it will be desirable, in addition to retaining the possibility of using full power for maximum speed and manoeuvre, to be able to shut-off the supply of additional fuel and partially close the nozzle for economical cruising, and furthermore, precise control of the direction of discharge of the working fluid is no longer essential. By use of the device according to the invention the provision of a separate control system for varying the throat area of the nozzle during horizontal flight is made unnecessary since a last part of the total range of swivelling movement of the nozzle can be used for this purpose without introducing objectionable large variations in the direction of discharge of the working fluid.

The invention is illustrated by the examples shown in the accompanying drawings. In the drawings.

Figure 1:
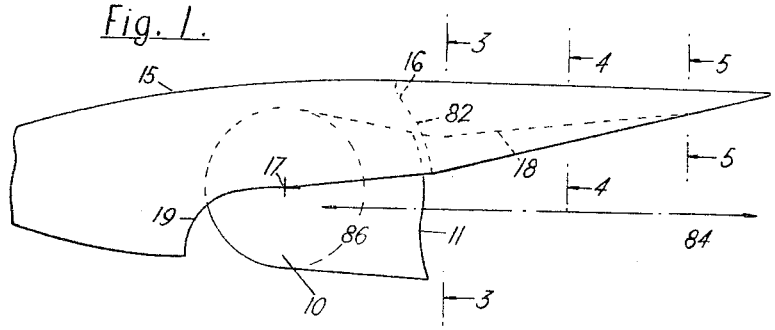
FIGURES 1, 1A and 1B are side views of a swiveling nozzle for a vertical take-off aircraft, shown in three different positions.
Figure 2:
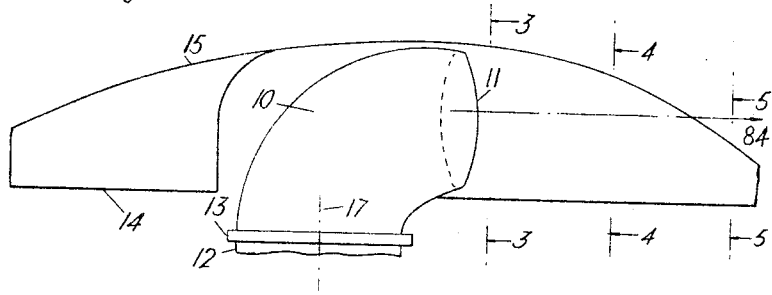
FIGURE 2 is an underneath plan view corresponding to FIGURE 1.
Figure 3:
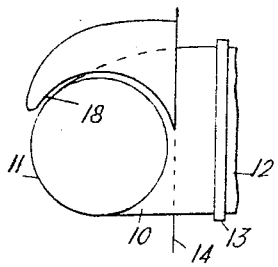
Figure 4:
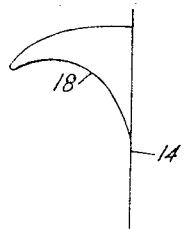
Figure 5:
Figure 6:
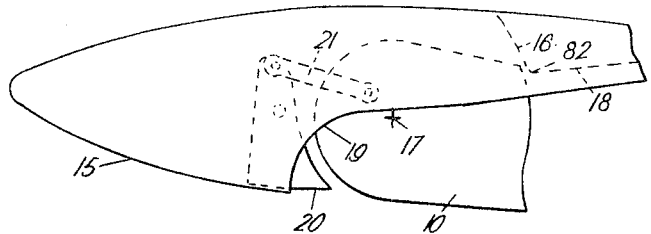
Figure 6A:
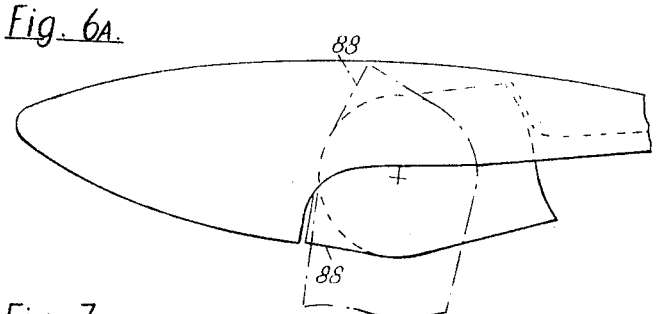
Figure 7:
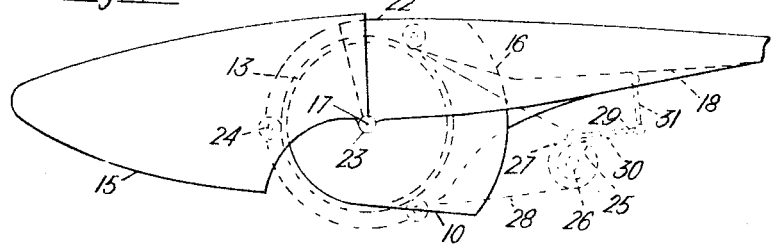
Figure 8:
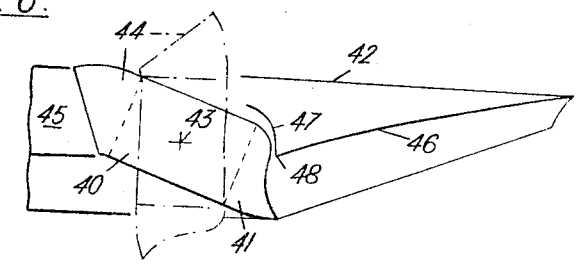
Figure 10:
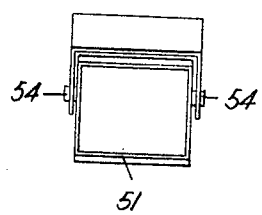
Figure 9:
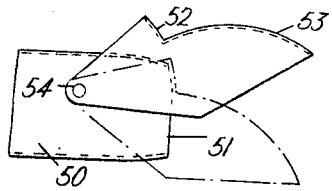

FIGURES 3, 4 and 5 are sections at the lines 3—3, 4—4 and 5—5 respectively in FIGURES 1 and 2;

FIGURES 6, 6A, and 7 are side views of three modified systems;

FIGURE 8 is a diagrammatic side view of an installation incorporating a gas turbine jet propulsion engine mounted to swivel as a whole between near vertical and near horizontal positions;

FIGURE 9 is a side view of a fixed nozzle with a deflector;

FIGURE 10 is a corresponding rear view; and

Figure 11:
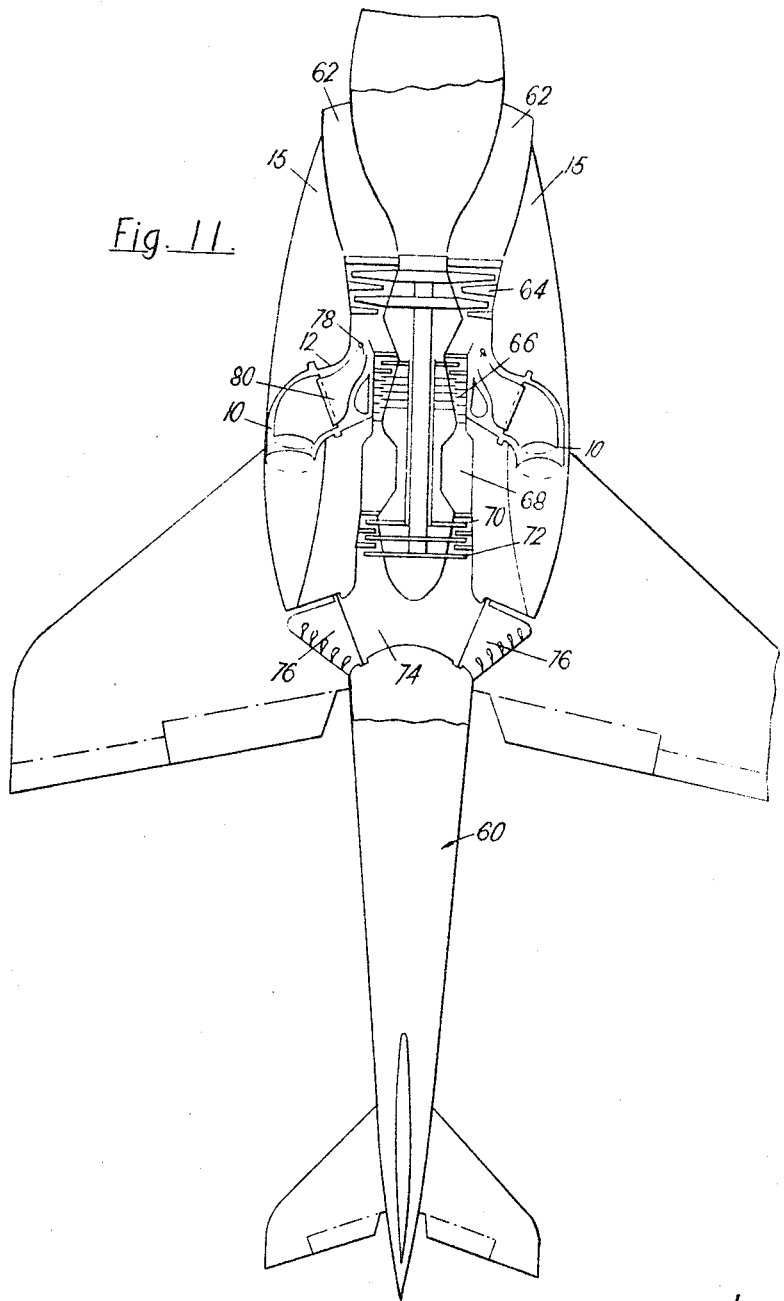

FIGURE 11 is a diagrammatic view from beneath of an aircraft in which a nozzle as shown in FIGURES 1 to 5, or any of FIGURES 6, 6A and 7, may be used.

The aircraft shown in FIGURE 11 has a power plant housed in a fuselage 60. The power plant comprises air intakes 62, a low pressure compressor 64, a high pressure compressor 66, a combustor 68, and high and low pressure turbines 70, 72. Part of the air delivered by the low pressure compressor 64 passes to the high pressure compressor 66, and part passes through two stub ducts 12, one at each side of the fuselage 60. These stub ducts carry rotatable elbow nozzles 10, described in more detail below. The low pressure turbine 72 discharges exhaust gas into a bifurcated duct 74 which carries two further elbow nozzles 76, one at each side of the fuselage 60. The elbow nozzles 10, 76 may all be swivelled so as to be directed rearwards, for forward flight, or downwards, for vertical take-off or landing.

FIGURES 1 to 5 show one particular arrangement of one of the forward elbow nozzles 10 in an aircraft having the general arrangement as shown in FIGURE 11. The nozzle is mounted to rotate on the duct 12 by means of a bearing 13. The nozzle projects through the side 14 of the aircraft fuselage. The nozzle 10 has an outlet lip 11, and during rotation of the nozzle this lip 11 describes an arcuate track. A fairing 15 is attached to the aircraft in front of the nozzle to reduce aerodynamic drag.

Figure 1A:
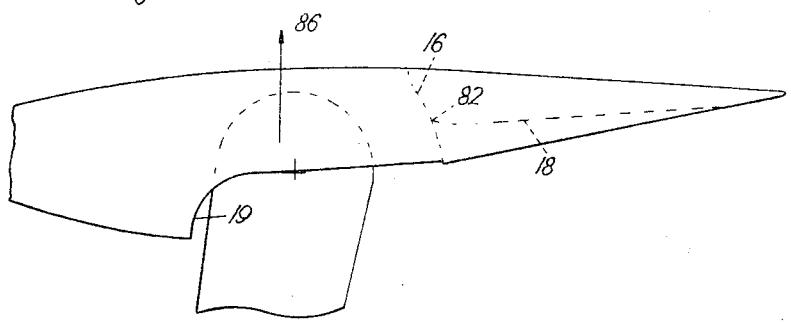
Figure 1B:
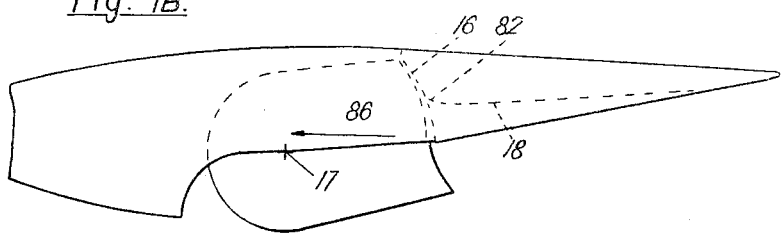

During take-off and landing, fuel is burnt in the air supplied through the duct 12 in order to increase the thrust exerted on the nozzle. As shown in FIGURE 11, the fuel is supplied into the air through an injector 78, and combustion is stabilised by a perforated flame holder 80. When fuel is being burnt in the air, the nozzle has to be operated with its full outlet area as defined by the outlet lip 11, but during horizontal flight, except when maximum speed and power of manoeuvre is required, as for example in aerial combat, a lower thrust suffices to maintain an economical cruising speed, and the additional fuel supply can be shut off and the nozzle outlet area suitably reduced. FIGURE 1A shows the position for vertical take-off, FIGURE 1 the position for horizontal flight at maximum speed, and FIGURE 1B the position for horizontal flight at cruising speed.

By employing the present invention, the nozzle outlet area can be controlled during horizontal flight without the necessity of introducing a separate control for this purpose, a last part of the rearward swivelling movement of the nozzle being used to effect outlet area control.

In this example a visor 16, shaped as a surface of revolution about the axis of rotation 17 of the nozzle, is attached to an upper part of the fairing 15 in a position extending fully across an upper end portion of the arcuate track described by the nozzle outlet lip 11 so that it begins to blank off part of the outlet area of the nozzle as the nozzle approaches its horizontal position. The operative edge of the visor is indicated at 82. The part of the outlet lip 11 which cooperates with the visor is likewise on a surface of revolution about the axis 17, so that there is close cooperation between the visor and the lip.

If this visor were used alone there would be a substantial variation in the direction of thrust as the nozzle was rotated to bring the visor into operation, which would be a disturbing factor in the control of the aircraft. To reduce or eliminate this effect, a flow control surface 18 is provided extending in the downstream direction from the operative adge 82 of the visor in a direction and for a sufficient distance to constitute an important factor in determining the direction of the thrust when the nozzle is partially blanked off by the visor. The extent and shape of the flow control surface appears from FIGURES 1 and 2, in conjunction with FIGURES 3 and 5. It will be appreciated that the flow control surface plays an increasingly important part in determining the direction of the thrust as the blanking-off action increases. The flow control surface may act as a simple deflector or as an expansion surface, depending upon whether the working fluid passes the outlet lip 11 at or above ambient pressure.

In the example illustrated in FIGURES 1 to 5, the nozzle lip 11 reaches contiguity with the operative edge of the visor 16 when in a slightly downwardly directed position (FIGURES 1 and 3). The lower part of the lip is extended beyond the surface of revolution in which the upper part of the lip lies, so as to cause the mean direction of discharge from the nozzle outlet to be horizontal at this stage, as indicated by the arrow 84 in FIGURE 1. The flow control surface 18 in this case is an expansion surface diverging from the mean direction, so that the direction of the thrust is also horizontal, as indicated by the arrow 86. As the nozzle is rotated further upwards to decrease its throat area, towards the position shown in FIGURE 1B, the direction of thrust 86 of the system does not vary to a significant extent. If the visor is arranged so that it only begins to blank off the nozzle when the latter is turned to its horizontal position, the extension of the lower part of the nozzle lip will not be required, but there may be increased losses when the nozzle is turned up to the position of minimum outlet area. In the example shown, the flow control surface is so placed and shaped as to cause the mean direction of discharge 84 to be slightly divergent from the center line of the aircraft, as shown in FIGURE 2.

A control for progressively shutting off the supply of additional fuel may be linked to the nozzle if desired, or may be responsive to an engine operation parameter varying with nozzle throat area.

To enable the nozzle to rotate into its downward discharge position, as shown in FIGURE 1A, the fairing 15 has to be cut away at 19 in front of the nozzle. This leaves a gap when the nozzle is turned to the horizontal flight position, and this gay may cause an increase in drag. As shown diagrammatically in FIGURE 6, this gap may be covered by a swinging door 20 connected to the nozzle by an operating link 21 so as to open as the nozzle is turned down to its vertical position.

Alternatively, as shown in FIGURE 6A, a plate 88 may be attached to the nozzle which closes the gap when the nozzle is in its fully raised (minimum outlet area) position and which leaves only a small gap when the nozzle is turned down to the position in which its lip is contiguous with the operative edge of the visor.

While fixing the visor and flow control surface to the aircraft body or engine pod represents the simplest mechanical solution, it is possible to mount the visor and flow control surface for movement of both of them relatively to the body or pod for the purpose of correcting any residual deviation in the direction of thrust during the nozzle area variation phase of operation.

FIGURE 7 illustrates an arrangement of this kind in which the visor 16 and the flow control surface 18 are formed on a member 22 which is hinged to the front fairing 15 and 23, about an axis coincident with the axis of rotation 17 of the nozzle 10, and is additionally supported by a system of rollers 24 running on a flange of the nozzle bearing 13. The drawing shows the parts in the position in which blanking-off by the visor is about to begin. As this proceeds, the visor and flow control surface are turned downwards through a small angle around the nozzle axis 17 by a suitable mechanism, illustrated diagrammatically as a cam 25 on a shaft 26 which rotates the nozzle through a sprocket 27 and chain 28, the cam acting through a lever 29, pivoted at 30 on the fixed structure, and a link 31.

It will be appreciated that, in both the system shown in FIGURES 1 to 5 and that shown in FIGURE 7, the visor 16 and its attached flow control surface 18 are interconnected with the nozzle for relative movement about the axis 17, which is transverse to the direction of discharge of the efflux past the nozzle outlet lip 11 and lies upstream of the nozzle outlet lip. The difference is that in FIGURES 1 to 5 the visor and flow control surface are fixed to the main aircraft structure whereas in FIGURE 7 the system as a whole is movable in relation to the main aircraft structure.

FIGURE 8 illustrates diagrammatically an application of the invention to a power unit comprising a jet propulsion gas turbine engine 40 with a nozzle 41 which is mounted in a pod 42 for rotation as a whole about an axis 43. In one position, shown in chain-dotted lines, the engine, which is preferably of the by-pass or ducted fan type with optional fuel burning in the by-pass or fan air duct, draws in air through an intake 44 then projecting through the upper wall of the pod and discharges products of combustion downwards through the nozzle 41 for take-off and landing. For transition to horizontal flight the engine is turned about the axis 43 so that its intake 44 receives air through an intake duct 45 extending through the pod from a forward facing intake opening (not shown) and its nozzle 41 discharges rearwardly over a curved expansion surface 46 to which is connected a visor plate 47 with an operative edge 48 permitting the nozzle throat area to be varied by varying the angular position of the engine without significantly altering the direction of thrust.

FIGURES 9 and 10 illustrate a rectangular section horizontal jet pipe 50 with a nozzle outlet lip 51 and a combined visor 52 and deflector 53 which are mounted on the jet pipe for turning about trunnions 54. This device is intended for a short run take-off turbojet aircraft for operation in situations in which it is not permissible to burn additional fuel in the jet pipe during take-off, for example for taking off from a ship's deck. In such cases, to obtain maximum thrust for take-off a reduction in nozzle throat area is required. By turning the visor and deflector 52, 53 from the inoperative position shown in full lines, which is used for normal horizontal flight, to the position shown in chain lines, the throat area of the nozzle is suitably reduced for take-off, and at the same time the deflector 53 turns the efflux downwards to provide thrust in an oblique forwards and upwards direction to assist take-off.

I claim:
1. A variable area jet nozzle system comprising a nozzle having an outlet defined by a lip, and an external visor for selective partial blanking-off of the outlet, the nozzle and visor being capable of relative rotary movement about an axis which lies transverse to the discharge from the outlet and which lies upstream of the outlet, the lip thereby having an arcuate track of movement relative to the visor, the visor being shaped to have an operative edge which by the relative movement is carried between an inoperative position clear of the track and an operative position extending fully across and close to an end portion of the track, and the visor having a flow control surface extending downstream from its operative edge in a direction and for a sufficient distance to constitute an important factor in determining the direction of thrust of the system when the nozzle outlet is partially blanked-off by the visor.

2. A system according to claim 1 including main structure to which the visor is fixed, and a bearing supporting the nozzle to swivel on the main structure about the axis of relative movement.

3. An aircraft including main structure, a jet engine mounted in the main structure, and a nozzle system according to claim 1, the nozzle being connected to receive a flow of gas from the engine and being mounted in the main structure to swivel between a position for downward discharge and a position for rearward discharge.

4. An aircraft according to claim 3, in which the visor, together with the flow control surface, is fixed to the main structure.

5. An aircraft according to claim 4, in which, considering the nozzle when rearwardly directed, an upper part of the lip lies in a surface of revolution about the axis of rotation of the nozzle, and a lower part of the lip extends beyond that surface of revolution.

6. An aircraft according to claim 3, including a fairing mounted on the main structure forward of the nozzle, and means for closing a gap between the fairing and the nozzle when the nozzle is directed rearwards.

7. An aircraft according to claim 3, in which the visor is pivoted to the main structure about an axis coincident with the axis of swivelling of the nozzle, and there is means for moving the visor downwards in response to the latter part of the movement of the nozzle to the rearward position.

8. An aircraft including a main structure, a jet engine, and a nozzle system according to claim 1, the nozzle being connected to receive a flow of gas from the engine, and the engine and nozzle being mounted in the main structure for joint swivelling movement between a position for downward discharge and a position for rearward discharge, and the visor, together with the flow control surface, being fixed to the main structure.

9. An aircraft including a main structure, a jet engine mounted in the main structure, and a nozzle system according to claim 1, the nozzle being connected to receive a flow of gas from the engine and being fixed to the main structure in a position to discharge rearwards, and the visor, together with the flow control surface, being mounted in the main structure to move upwards to inoperative position and downwards to operative position, and the flow control surface being curved so as to deflect the discharge downwards when in operative position.

No references cited.

MARK NEWMAN, *Primary Examiner.*

C. R. CROYLE, *Assistant Examiner.*